(12) United States Patent
French et al.

(10) Patent No.: US 6,767,172 B2
(45) Date of Patent: Jul. 27, 2004

(54) LOW LOADER TRAILER

(75) Inventors: Peter John French, College Park (AU); Michael David Nunn, Prospect (AU)

(73) Assignee: Birrana Engineering Pty Ltd, South Australia (AT)

( * ) Notice: Subject to any disclaimer, the term of this patent is extended or adjusted under 35 U.S.C. 154(b) by 87 days.

(21) Appl. No.: 10/234,528

(22) Filed: Sep. 3, 2002

(65) Prior Publication Data

US 2003/0044265 A1 Mar. 6, 2003

(51) Int. Cl.[7] .................................................. B60P 1/04
(52) U.S. Cl. ....................................................... 414/481
(58) Field of Search ................................. 414/481, 482, 414/483, 484, 485

(56) References Cited

U.S. PATENT DOCUMENTS

| | | | | | |
|---|---|---|---|---|---|
| 2,605,916 | A | * | 8/1952 | Martin | 414/481 |
| 3,756,443 | A | * | 9/1973 | Verschage et al. | 414/481 |
| 3,883,019 | A | * | 5/1975 | Hansen, Jr. | 414/481 |
| 3,894,645 | A | * | 7/1975 | Verschage | 414/481 |
| 4,078,684 | A | * | 3/1978 | Hasenberg et al. | 414/481 |
| 5,415,425 | A | * | 5/1995 | Zerbe et al. | 280/441.2 |
| 5,419,577 | A | * | 5/1995 | Murray | 280/656 |
| 5,688,099 | A | * | 11/1997 | Fischer | 414/537 |
| 5,904,364 | A | * | 5/1999 | Wylezinski et al. | 280/401 |
| 6,224,082 | B1 | * | 5/2001 | Landoll et al. | 280/425.2 |
| 6,511,092 | B1 | * | 1/2003 | Chepa | 280/656 |

FOREIGN PATENT DOCUMENTS

CA       1051938       4/1979

* cited by examiner

*Primary Examiner*—Joe Dillon, Jr.
(74) *Attorney, Agent, or Firm*—Webb Ziesenheim Logsdon Orkin & Hanson, P.C.

(57) ABSTRACT

A modular front loadable low loader trailer 20 for transporting large vehicles is disclosed. The trailer 20 includes: a rear axle module 110 for supporting ground engaging wheels; a rear cross-member module 100 removably connected to the rear axle module 110; a front cross-member module 26; and a pair of deck modules 80 and 90, each removably connected between the front and rear cross-member modules 26 and 100. Each of the modules are separable for transport. Pin joints are provided between adjacent modules. The pin joints include interleaved plates held together by removable transverse pins 81. In an alternative embodiment, the rear cross member 100 is permanently connected to the axle module.

16 Claims, 9 Drawing Sheets

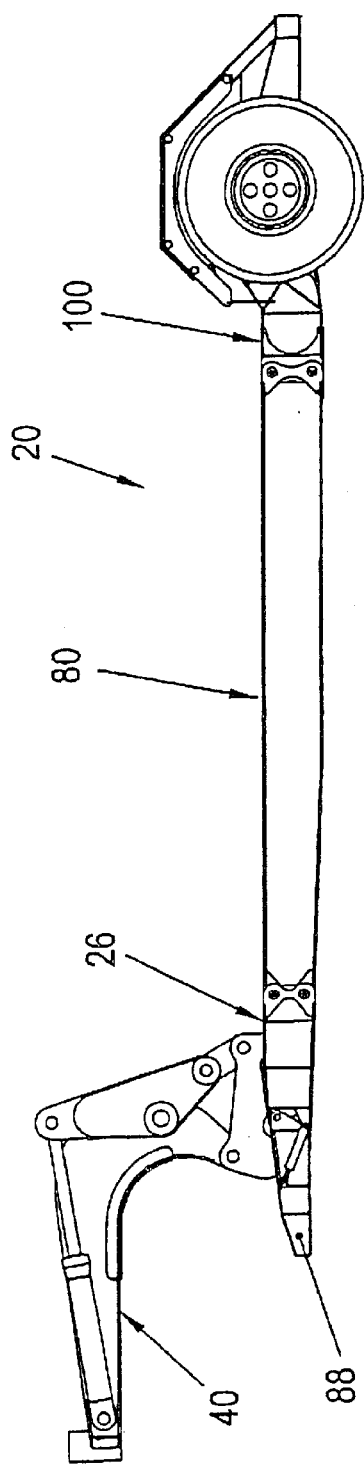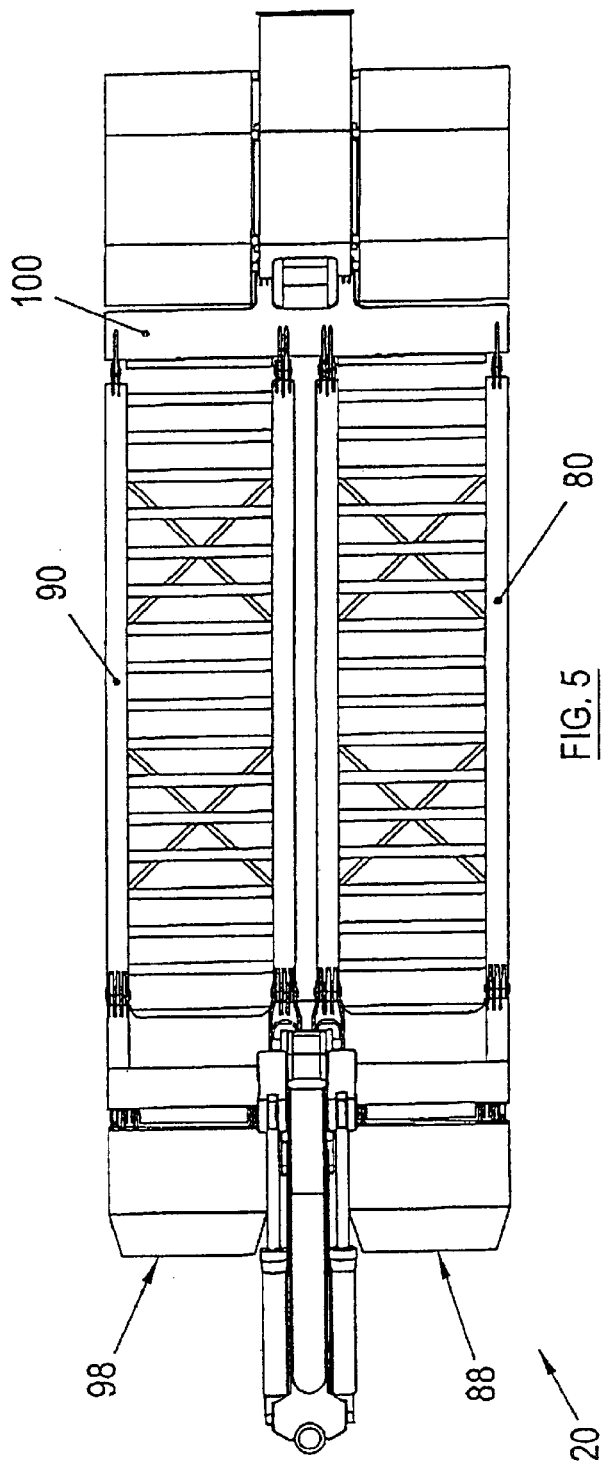

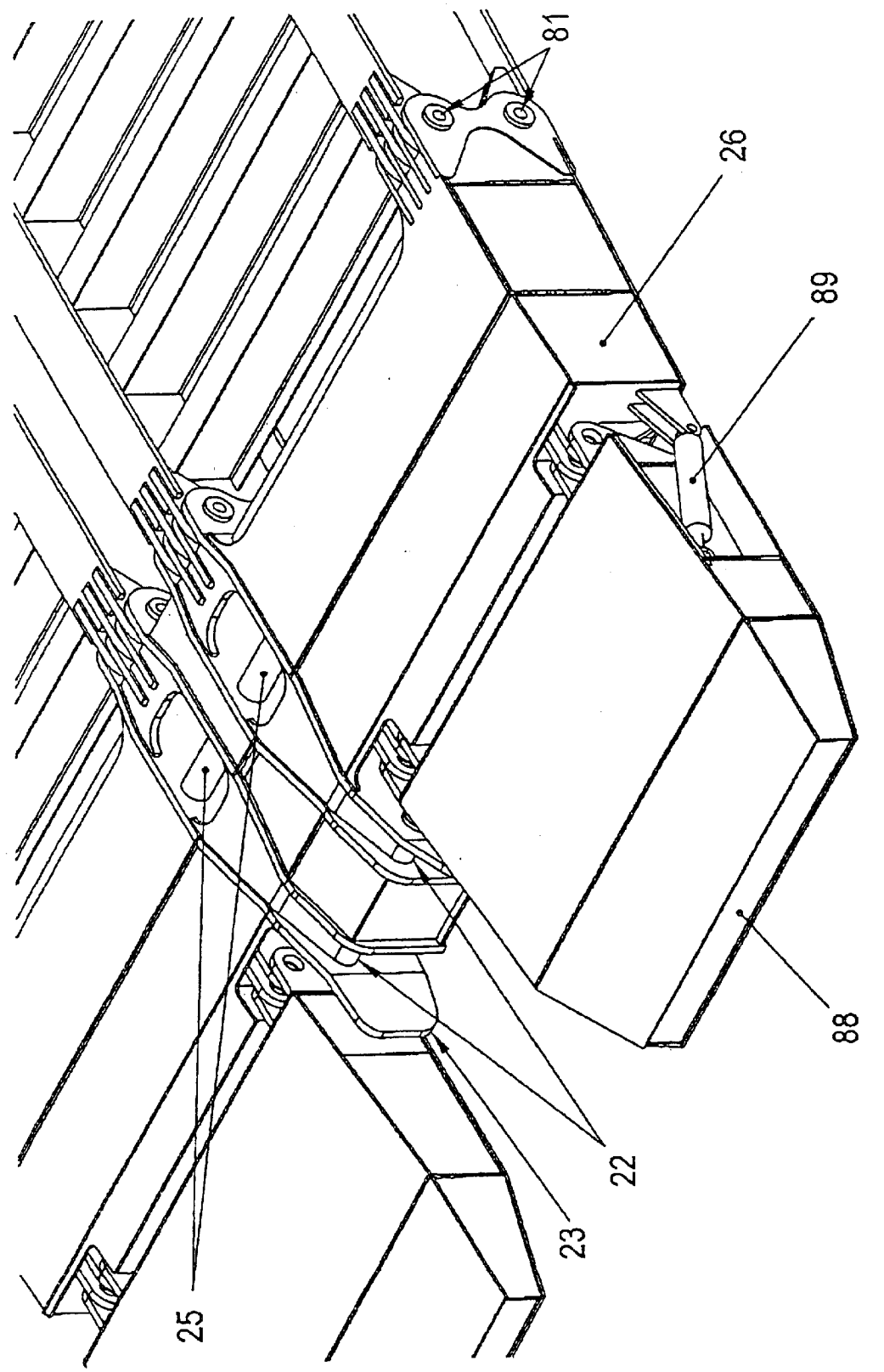

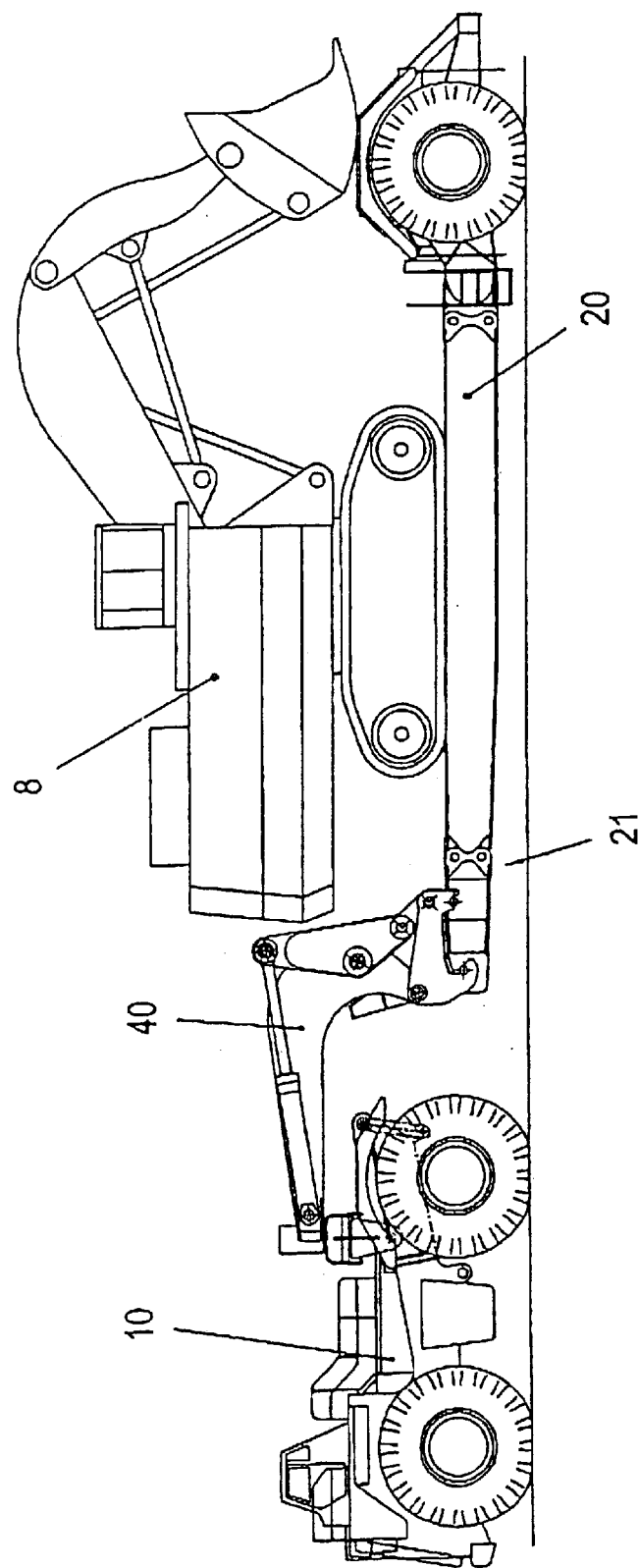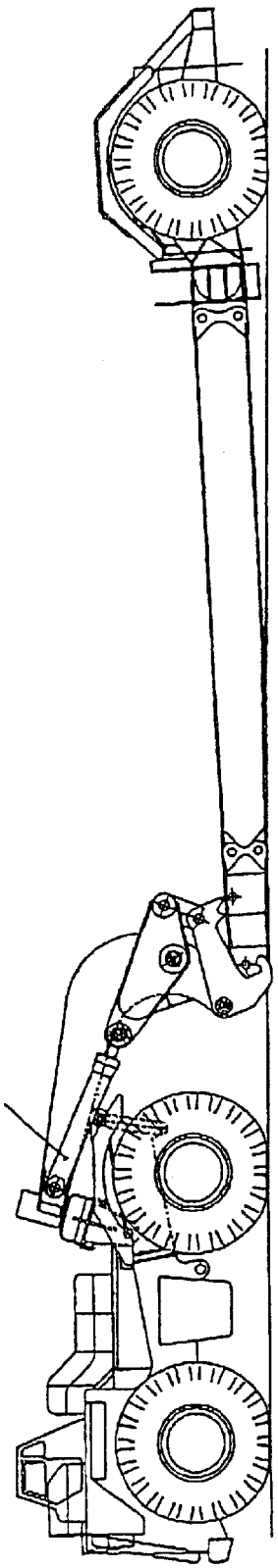
FIG. 8
FIG. 9

LOW LOADER TRAILER

FIELD OF THE INVENTION

The present invention relates to heavy duty industrial trailers and in particular to large front loading flat bed trailers.

BACKGROUND OF THE INVENTION

Transporting very large equipment such as earthmoving equipment used on mine sites, particularly large tracked vehicles require specially designed large flat bed trailers. Conventional large rear loading trailers have a large number of wheels at their rear ends. Because of the large number of wheels, their diameter can be relatively small to facilitate loading over the wheels. However, the tip of the loading deck is still usually high enough off the ground to make loading of some large vehicles difficult. Large front loading trailers are also known. These trailers typically have a small number of large wheels located at their rear ends, a large flat bed and have liftable front ends. The liftable front ends are designed to be lowered to engage the ground so as to present a minimal step or ramp up on to the trailer bed for loading.

Special hitch arrangements, referred to as gooseneck hitches have been developed to allow lifting and lowering of such trailer ends. These hitch assemblies are designed so that the gooseneck can be removed from the trailer leaving the front end clear for loading.

Large front loading flat bed trailers are typically used on mine sites which are often in remote locations. The size of these trailers can create practical difficulties. For instance transportation of the trailers themselves over large distances presents problems due to their size and weight.

It is an object of the invention to overcome or at least ameliorate the problems associated with large front loading flat bed trailers.

SUMMARY OF THE INVENTION

According to the invention there is provided a modular front loadable low loader trailer for transporting large vehicles comprising:

- a rear module for supporting ground engaging wheels, the rear module having a rear cross-member;
- a front cross-member module; and
- a pair of deck modules, each removably connected between the front and rear cross-member modules, wherein each of the modules are separable for transport.

Preferably the trailer further comprises a plurality of pin joints between adjacent modules.

Preferably each pin joint comprises:

- at least two parallel spaced apart plates depending from a first side of the joint;
- at least one plate depending from a second side of the joint; and
- at least one removable pin,
- wherein, when the trailer is assembled, the plates are interleaved and define a hole extending through all of the plates, the hole receiving the pin so as to removably connect adjacent modules.

Preferably the pins are arranged in vertically spaced apart pairs.

Preferably the front cross-member module is adapted to receive a removable gooseneck assembly for lifting and towing.

In one preferred form of the invention, the rear module is itself modular, comprising two removably connected modules. The two modules of the rear module are: a rear axle module for supporting ground engaging wheels; and a rear cross-member module removably connected to the rear axle module.

A specific embodiment of the invention will now be described in some further detail with reference to and as illustrated in the accompanying figures. This embodiment is illustrative, and is not meant to be restrictive of the scope of the invention.

BRIEF DESCRIPTION OF THE DRAWINGS

A preferred embodiment of the invention is illustrated in the accompanying representations in which:

FIG. 4 is a side view of the trailer of FIG. 1;

FIG. 5 is a plan view of the trailer of FIG. 1;

FIG. 6 is a partial perspective view showing the front end of the trailer of FIG. 1 from above;

FIGS. 8 and 9 show the trailer of FIG. 1 connected to a tow vehicle 10 by a gooseneck 40 in a loaded and unloaded condition respectively.

DETAILED DESCRIPTION OF THE PREFERRED EMBODIMENTS

Figure 1:
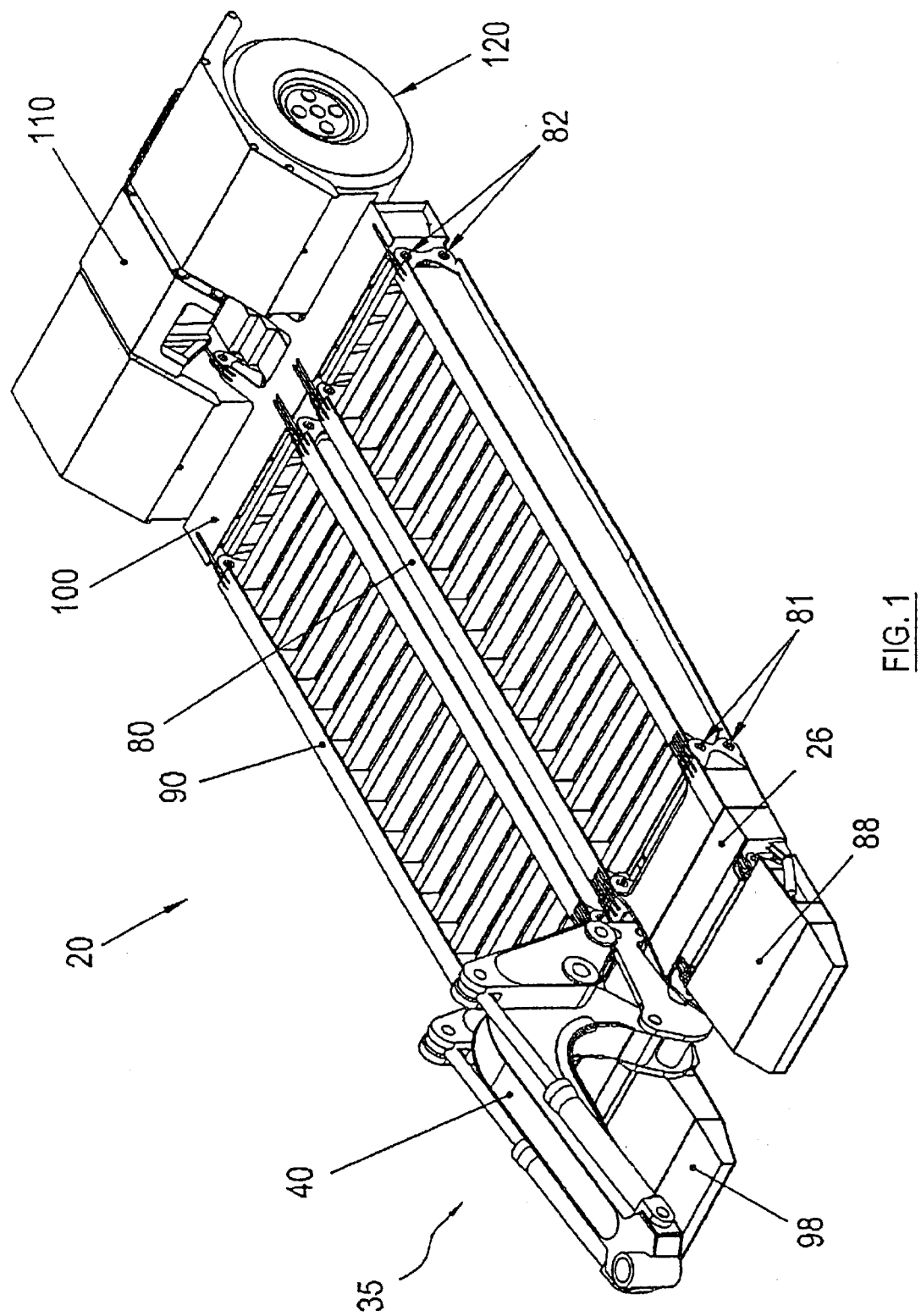
FIG. 1 is a perspective view of a modular front loadable low loader trailer according to a first embodiment of the invention.

Referring to FIG. 1, the modular front loadable low loader trailer 20 comprises a rear axle module 110 for supporting ground engaging wheels 120, a rear cross-member module 100 removably connected to the rear axle module 110, a front cross-member module 26 adapted to receive a removable hitch assembly 40 for lifting and towing, and a pair of deck modules 80 and 90 removably connected between the front and rear cross-member modules 26 and 100. A plurality of removable cylindrical pins are provided to hold the modules together. Front and rear left hand deck module retaining pins 81 and 82 are shown in FIG. 1.

Figure 7:
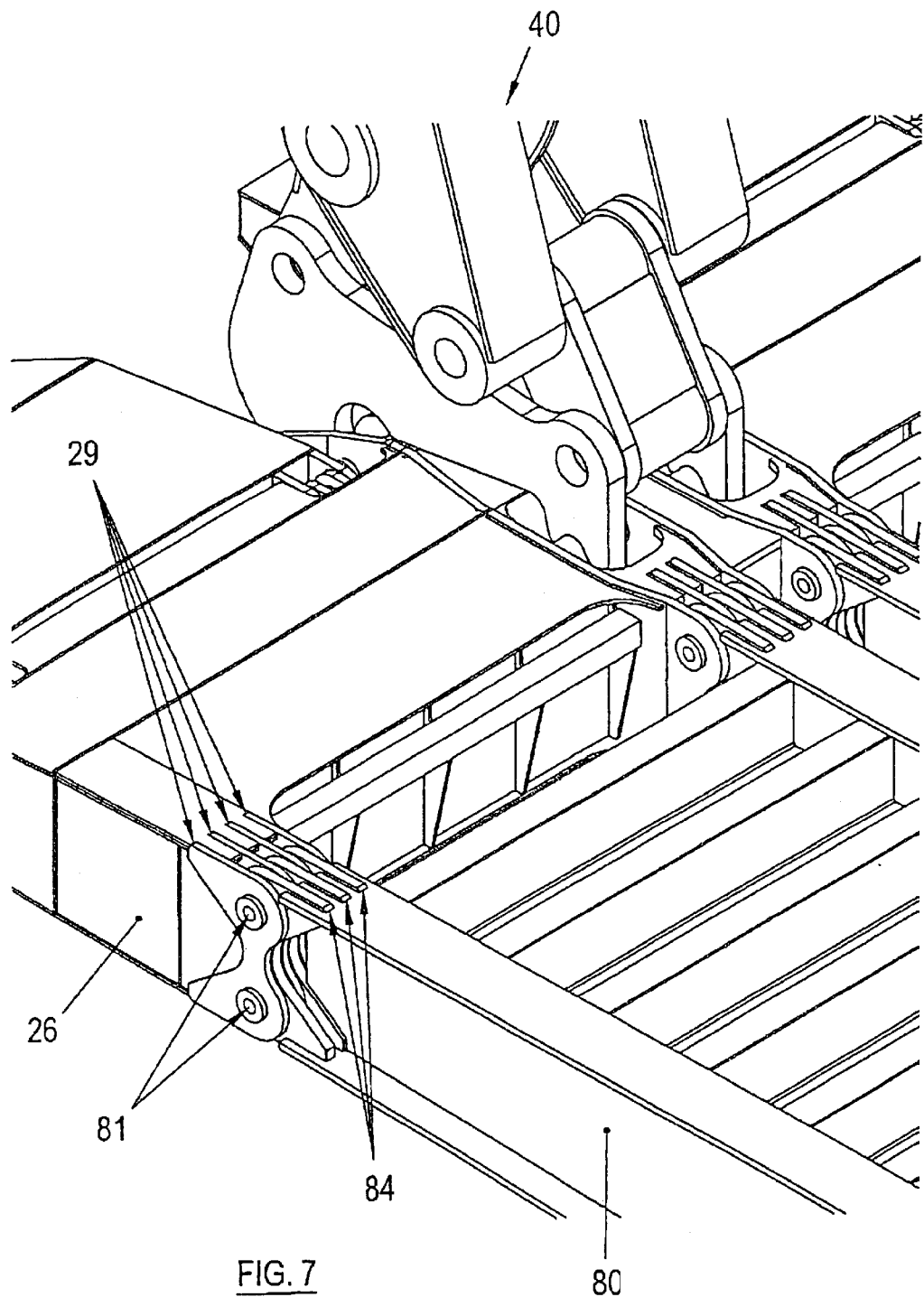
FIG. 7 is a partial perspective view of the trailer of FIG. 1 showing a pin joint between modules.

FIG. 7 shows one of the pin joints between the front cross member module 26 and one of the deck modules in more detail. With the particular joint illustrated, there are four parallel spaced apart plates 29 depending from the first side of the joint (the front cross member module side) and three parallel spaced apart plates 84 extending from a second side of the joint (the deck module side). It can be seen that when the trailer is assembled, the plates are interleaved and defined a pair of spaced apart holes extending through all of the plates. The holes receive pins 81 so as to removably connect the adjacent modules. This arrangement provides a high capacity joint between modules. The number of plates used in a particular application can be varied depending on load and other design requirements.

Figure 10:
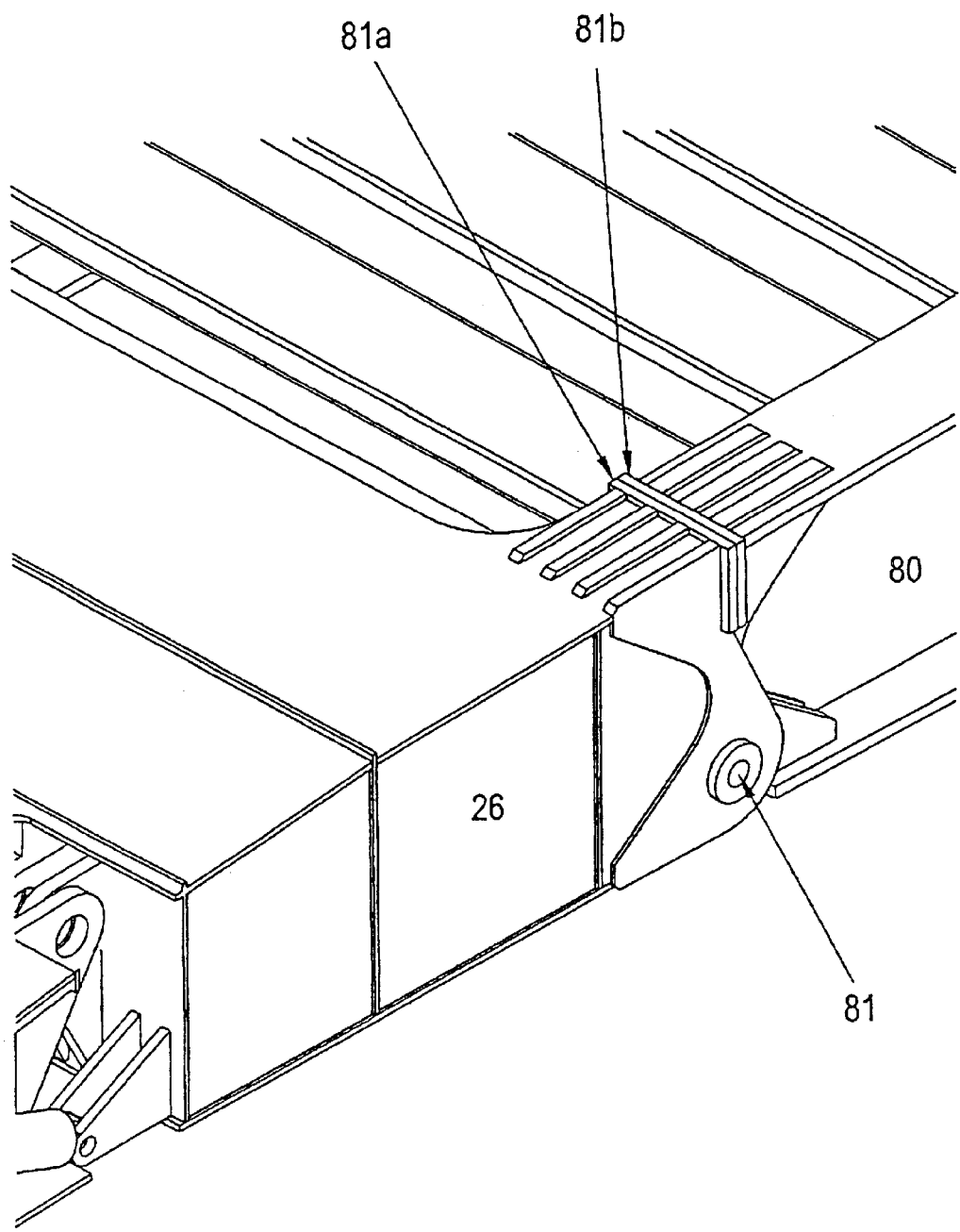
FIG. 10 is a partial perspective view showing an alternative joint detail to that shown in FIG. 7.

An alternative joint to the double pin joint shown in FIG. 7 is shown in FIG. 10. This alternative joint comprises a plurality of interleaved plates through which a pin 81 extends. Above pin 81 is a pair of opposed bearing plates 81a and 81b. Again, pin 81 is removable to allow disassembly. Any or all of the joints may be the above-described alternative joint construction.

A gooseneck assembly 35 having a frame 40 is shown connected to the trailer 20 in FIGS. 1–5. The gooseneck assembly 35 allows the front end of the trailer to be raised and allows the trailer 20 to be towed.

Referring to FIG. 6, the front cross-member module 26 of the trailer 20 is provided with longitudinally spaced apart first and second mounts 22 and 25. These mounts are adapted to receive the gooseneck assembly 35. The mounts 22 and 25 shown in FIG. 6 are in the form of pairs of co-axially aligned pins 22 and 25 respectively.

Provision of these coupling pins, recessed below the upper level of the deck, allows a gooseneck hitch assembly 35 to connect to the trailer 20 as shown in FIGS. 7, 1, 2, 3, 4 and 5.

Figure 2:
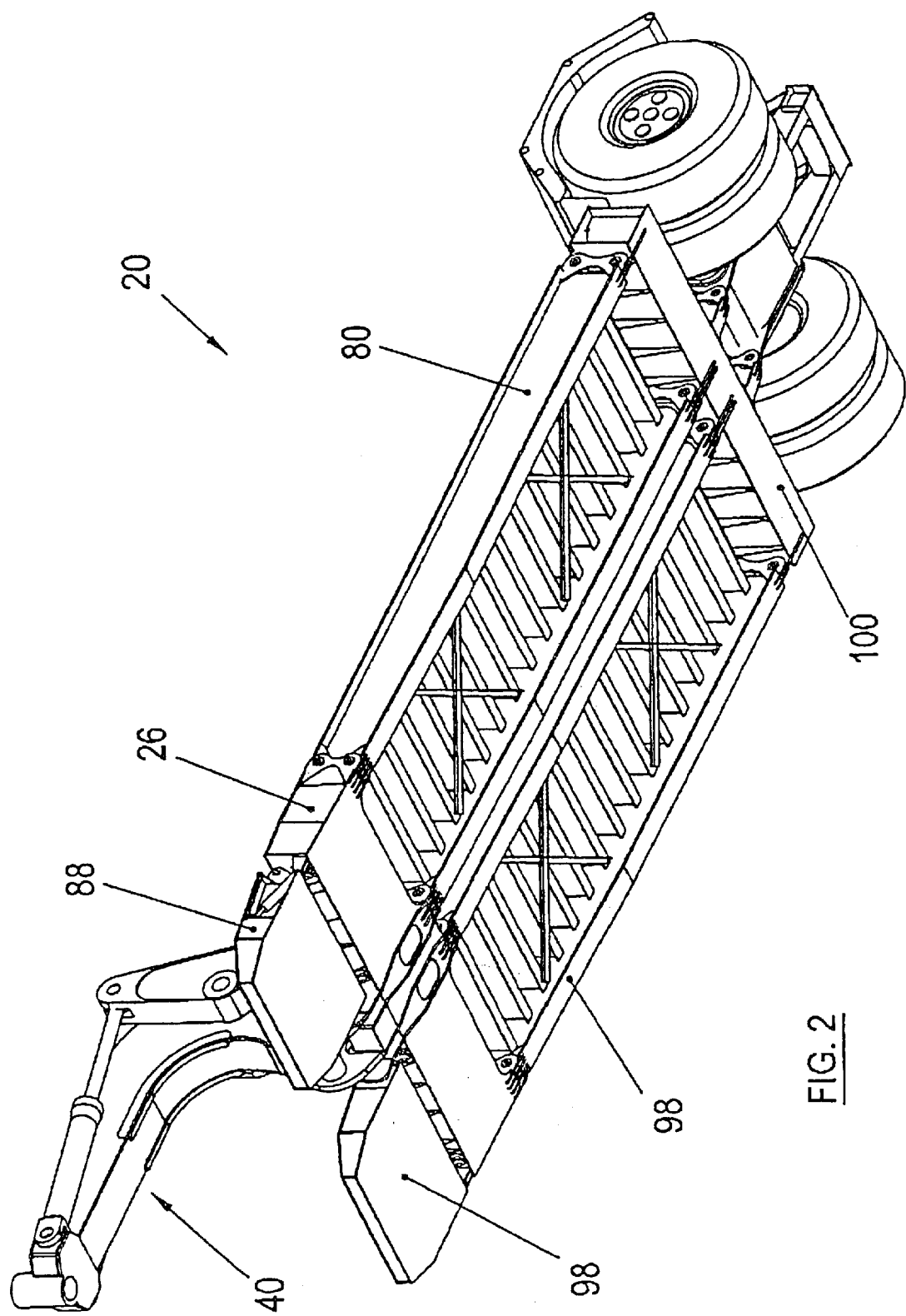
FIG. 2 shows the trailer of FIG. 1 in perspective view from beneath.
Figure 3:
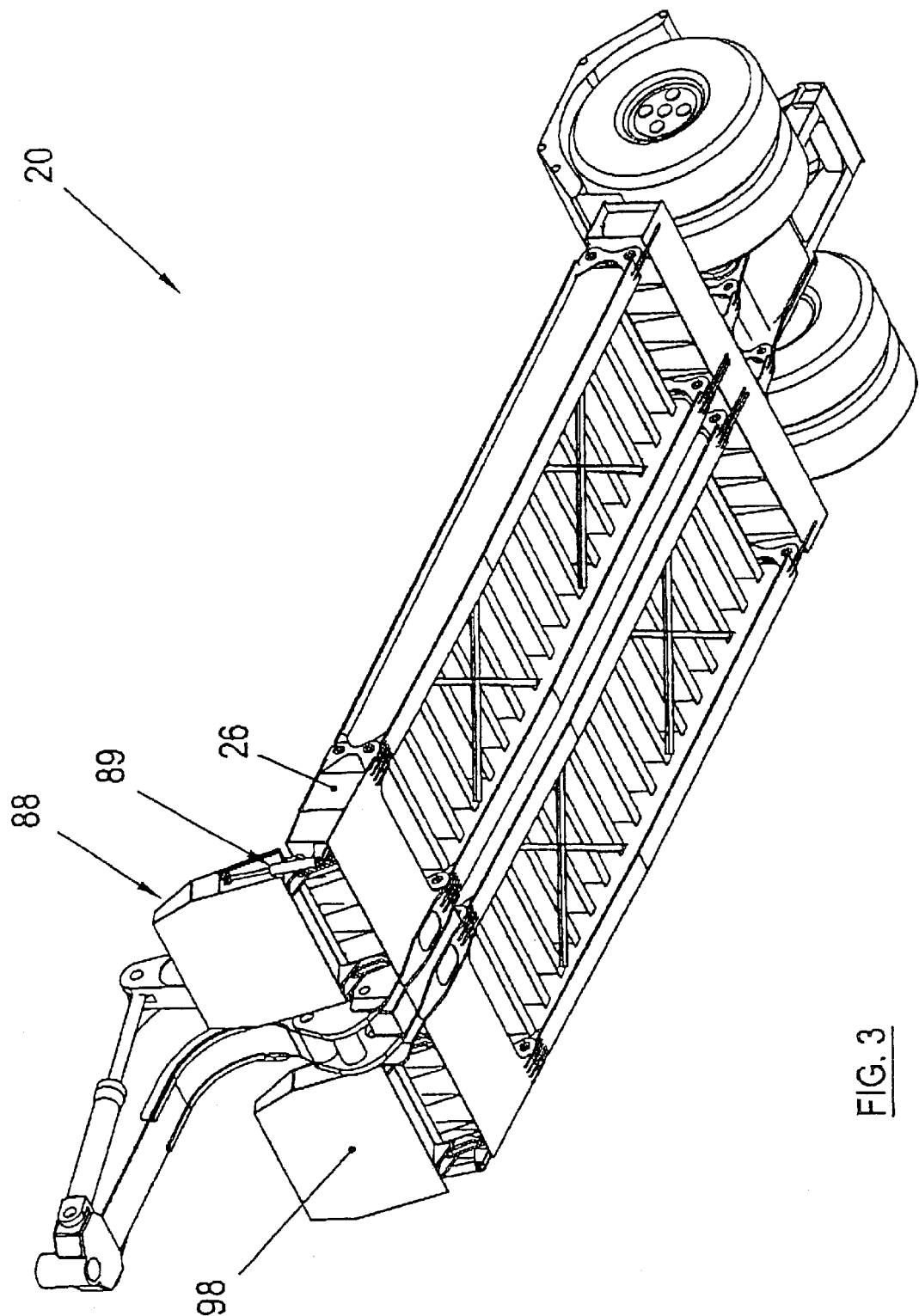
FIG. 3 is identical to that of FIG. 2 but with the front ramps of the trailer raised.

Referring to FIGS. 1, 2 and 3, folding ramps 88 and 98 are shown extending from the front of the front cross-member module 26. These ramps allow vehicles such as the excavator 8 shown in FIG. 8 to be driven onto the trailer more easily and with less jolting. The gap in between the ramps allows more clearance for downwards extending protrusions such as found on mobile blasthole drill rigs (known simply as blasthole drills). Once the excavator 8 is loaded onto the trailer 20, as shown in FIG. 8, the ramps 88 and 98 can be raised as shown in FIG. 3. Means for moving the foldable ramps 88 and 98 from a lower deployed loading and unloading position to a raised position is provided in the form of hydraulic cylinders 89 shown clearly in FIG. 6.

Figure 1A:
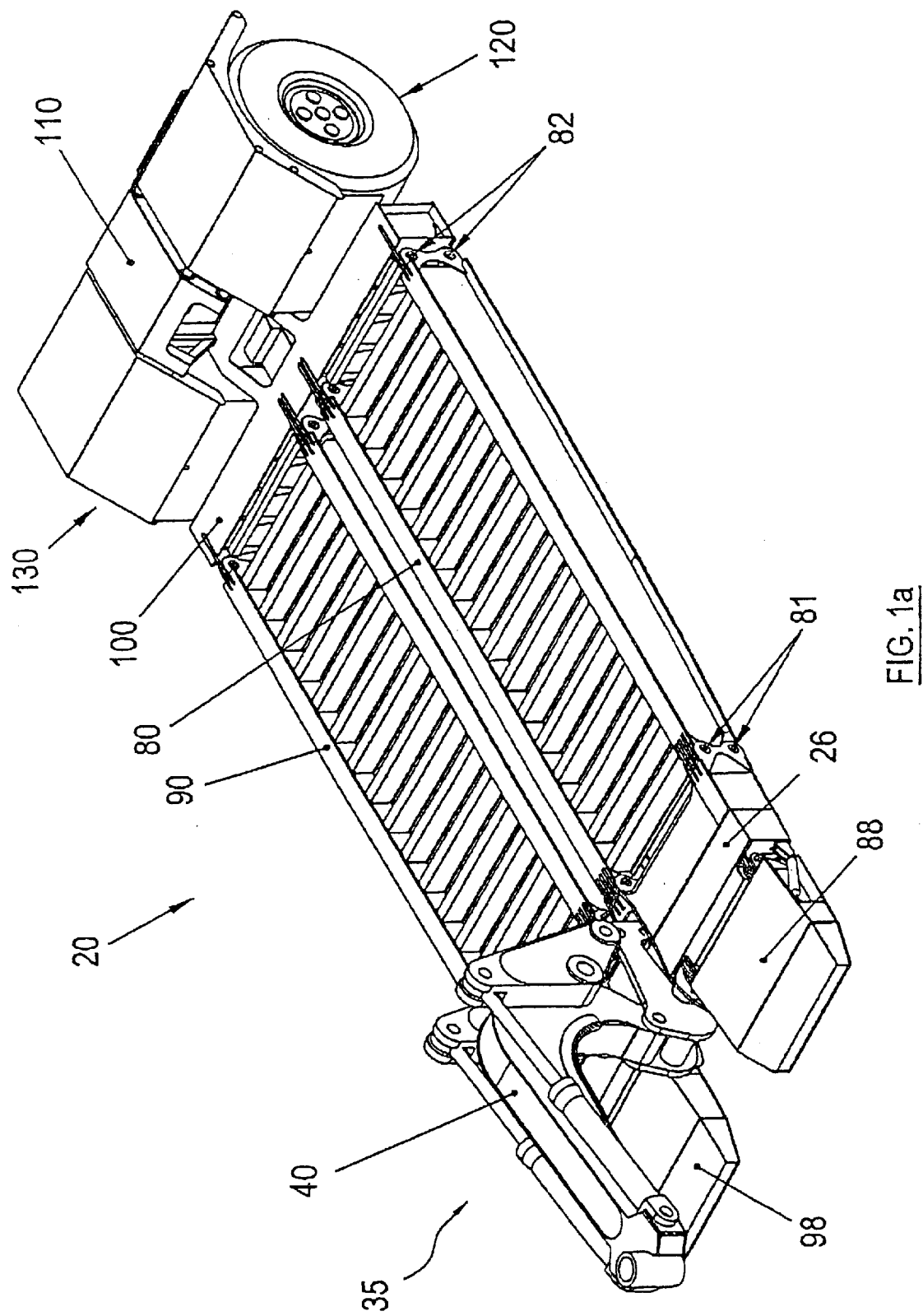
FIG. 1a is a perspective view of a modular front loadable low loader trailer according to a second embodiment of the invention.

An alternative embodiment of the invention is shown in FIG. 1a. This embodiment is similar to the first embodiment, but the rear axle module and rear cross member module are permanently joined to form a single rear module 130.

The trailers 20 as described above may be assembled and disassembled relatively easily. The size of the modules is such that they may be transported on public roads without the need for police escorts and expensive permits. This saves on the cost of transport for the initial delivery of the trailer and also allows the user of the trailer to transport it between mine sites at greatly reduced expense. It also makes the trailer easier to service and repair. Individual modules can be replaced or transported to service workshops for repair or modification.

The modularity of the trailer also allows efficiencies in producing a range of trailer sizes. Different length deck modules can be substituted without the need for different remaining modules.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

What is claimed is:

1. A modular front loadable low loader trailer for transporting large vehicles comprising:
   a rear module for supporting ground engaging wheels, the rear module having a rear cross-member;
   a front cross-member module; and
   a pair of deck modules, each removably connected between the front and rear cross-member modules,
   wherein each of the modules are separable for transport.

2. A trailer as claimed in claim 1 further comprising a plurality of pin joints between adjacent modules.

3. A trailer as claimed in claim 2 wherein each pin joint comprises:
   at least two parallel spaced apart plates depending from a first side of the joint;
   at least one plate depending from a second side of the joint; and
   at least one removable pin,
   wherein, when the trailer is assembled, the plates are interleaved and define a hole extending through all of the plates, the hole receiving the pin so as to removably connect adjacent modules.

4. A trailer as claimed in claim 3 wherein the pins are arranged in vertically spaced apart pairs.

5. A trailer as claimed in claim 4 wherein the front cross-member module is adapted to receive a removable gooseneck assembly for lifting and towing.

6. A trailer as claimed in claim 5 wherein the front cross-member further comprises longitudinally spaced apart first and second mounts adapted to receive a portion of the gooseneck assembly.

7. A trailer as claimed in claim 6 wherein the first mount comprises a first pair of coaxially aligned pins mounted transversely to the front end of the trailer.

8. A trailer as claimed in claim 7 wherein the second mount further comprises a second pair of coaxially aligned pins mounted transversely to the front end of the trailer.

9. A modular front loadable low loader trailer for transporting large vehicles comprising:
   a rear axle module for supporting ground engaging wheels;
   a rear cross-member module removably connected to the rear axle module;
   a front cross-member module; and
   a pair of deck modules, each removably connected between the front and rear cross-member modules,
   wherein each of the modules are separable for transport.

10. A trailer as claimed in claim 9 further comprising a plurality of pin joints between adjacent modules.

11. A trailer as claimed in claim 10 wherein each pin joint comprises:
   at least two parallel spaced apart plates depending from a first side of the joint;
   at least one plate depending from a second side of the joint; and
   at least one removable pin,
   wherein, when the trailer is assembled, the plates are interleaved and define a hole extending through all of the plates, the hole receiving the pin so as to removably connect adjacent modules.

12. A trailer as claimed in claim 11 wherein the pins are arranged in vertically spaced apart pairs.

13. A trailer as claimed in claim 12 wherein the front cross-member module is adapted to receive a removable gooseneck assembly for lifting and towing.

14. A trailer as claimed in claim 13 wherein the front cross-member further comprises longitudinally spaced apart first and second mounts adapted to receive a portion of the gooseneck assembly.

15. A trailer as claimed in claim 14 wherein the first mount comprises a first pair of coaxially aligned pins mounted transversely to the front end of the trailer.

16. A trailer as claimed in claim 15 wherein the second mount further comprises a second pair of coaxially aligned pins mounted transversely to the front end of the trailer.

* * * * *

UNITED STATES PATENT AND TRADEMARK OFFICE
CERTIFICATE OF CORRECTION

PATENT NO. : 6,767,172 B2
DATED : July 27, 2004
INVENTOR(S) : French et al.

It is certified that error appears in the above-identified patent and that said Letters Patent is hereby corrected as shown below:

Title page,
Insert Item:
-- [30] Foreign Application Priority Data
Sep. 3, 2001 (AU) ……………………….. PR 7398
Aug. 30, 2002 (AU) ……………………….. 2002300807 --

Signed and Sealed this

Twenty-second Day of February, 2005

JON W. DUDAS
*Director of the United States Patent and Trademark Office*